(12) United States Patent  
Selker

(10) Patent No.: US 6,863,220 B2  
(45) Date of Patent: Mar. 8, 2005

(54) MANUALLY OPERATED SWITCH FOR ENABLING AND DISABLING AN RFID CARD

(75) Inventor: Edwin Joseph Selker, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 40 days.

(21) Appl. No.: 10/334,572

(22) Filed: Dec. 31, 2002

(65) Prior Publication Data

US 2003/0132301 A1 Jul. 17, 2003

(51) Int. Cl.[7] ............................................. G06K 19/06
(52) U.S. Cl. .................... 235/492; 235/451; 257/679; 361/737
(58) Field of Search ................................ 235/492, 487, 235/451; 257/679; 340/572.1, 10.33; 361/737

(56) References Cited

U.S. PATENT DOCUMENTS

| | | | | |
|---|---|---|---|---|
| 5,648,761 | A | * 7/1997 | Kreft et al. ................. | 340/10.1 |
| 5,708,833 | A | * 1/1998 | Kinney et al. .............. | 710/301 |
| 6,011,483 | A | * 1/2000 | Tanaka et al. ........... | 340/10.33 |
| 6,021,951 | A | * 2/2000 | Nishikawa ................. | 235/492 |
| 6,073,856 | A | * 6/2000 | Takahashi .................. | 235/492 |
| 6,095,416 | A | * 8/2000 | Grant et al. ................ | 235/492 |
| 6,343,744 | B1 | * 2/2002 | Shibata et al. ............. | 235/492 |
| 6,355,890 | B1 | * 3/2002 | Kuroda ....................... | 200/5 A |
| 6,675,511 | B2 | * 1/2004 | Pines ........................ | 40/124.03 |
| 6,802,453 | B1 | * 10/2004 | Okaue et al. ............... | 235/492 |
| 2001/0011765 | A1 | * 8/2001 | Arruti ........................ | 257/679 |
| 2003/0178483 | A1 | * 9/2003 | Wakabayashi .............. | 235/380 |
| 2004/0112966 | A1 | * 6/2004 | Pangaud ..................... | 235/492 |

FOREIGN PATENT DOCUMENTS

JP          2001-67447 A    *  3/2001

* cited by examiner

*Primary Examiner*—Jared J. Fureman  
(74) *Attorney, Agent, or Firm*—Charles G. Call

(57) ABSTRACT

A radio operated data card whose outer jacket forms a sealed protected housing for internal electrical components, including an RFID integrated circuit which incorporates data storage and a radio frequency transceiver, an on card antenna, and manually operated, normally open electrical switch contacts connected between the on-card electronic circuitry and the antenna. The open switch contacts normally disable the card, protecting the data on the card from being surreptitiously read until the switch contacts are intentionally closed by the cardholder to enable data transfer to occur. The cardholder may activate the card by applying external pressure to the surface of the card at a predetermined position, closing the switch contacts which open again automatically when pressure is removed. A tactile indicia on the surface of the card allows the cardholder to determine by touch where the card should be pressed to enable data transfers to occur. In an alternate embodiment, a mating key in the possession of the cardholder may be brought into proximity with the card to close the normally open switch to permit information to be read from the card.

15 Claims, 4 Drawing Sheets

MANUALLY OPERATED SWITCH FOR ENABLING AND DISABLING AN RFID CARD

BACKGROUND OF THE INVENTION

Payment devices such as magnetic stripe-based credit cards may be targeted for theft and misuse. Readily available magnetic strip readers can be used by a thief to obtain account information from the card. Chip based cards that use electrical contacts to transfer information to and from a reader offer higher levels of security, and both magnetic strip and contact-bearing cards are further protected by the fact that the card must be in physical contact with the reader.

Contactless cards use radio signaling to exchange information with a host system, and offer substantial convenience since the card may be used without bringing it into direct contact with a reader. Developments in radio frequency identification (RFID) technology continue to yield larger memory capacities, wider reading ranges, and faster processing. RFID provides a powerful means of enhancing data handling processes, complimentary in many ways to other data capture technologies such as magnetic stripe. A range of RFID devices and associated systems are available to satisfy a broad range of applications.

However, because RF-enabled devices such payment cards can be read at a distance with a suitable transmitter and receiver, it is possible to surreptitiously obtain information from the card while it remains in its cardholder's possession. In addition to non-contact data transfer, wireless communication can also allow non-line-of-sight communication, meaning that an RF-enabled device may be read while it remains in the cardholder's wallet or purse.

BRIEF SUMMARY OF THE INVENTION

The present invention helps protect a contactless information storage device, such as an RFID payment card, from unauthorized misuse. The card employs an on-card antenna that couples integrated circuit electronics to a remote transmitter/reader. In accordance with the invention, the card incorporates an internal mechanism that normally disables the on-card electronic circuitry until the mechanism is intentionally actuated by the cardholder. The mechanism prevents the information on the card from being accessed until user activates the mechanism to enable signal transmission between the card and the remote unit.

The mechanism used to disable and enable the card must be flat enough to fit in the limited space available in a card meeting relevant ISO standards, must be robust enough to withstand stress and abuse, and must employ low-cost components and be easy to assemble and produce in quantity. In addition, the mechanism must not be potentially harmful to users due by introducing sharp or pointed edges, leak fluids, or contain a substance that might trigger allergic reactions. In addition, the mechanism employed should be functionally flexible in order to work in cards and other devices having a variety of shapes and sizes. Finally, the mechanism should be able to control the on-card electronics, typically a mass-produced integrated circuit chip, regardless of whether the chip is internally or externally powered.

The preferred embodiment of the invention takes the form of user-activated, normally open electrical switch contacts connected between the on-card electronic circuitry and an on-card antenna. Until the contacts are intentionally closed by the cardholder, the antenna is disconnected to prevent the card from transmitting or receiving information. After the user intentionally closes the switch contacts when the card is being used to provide information to an authorized remote reader/transmitter, the contacts automatically reopen to prevent the card from being accessed.

In a "passive" card which is powered by electrical energy induced in the antenna RF energy from the reader/transmitter, the card receives no power when the switch contacts are open. In an active circuit, the open switch contacts disable the card's ability to transmit by disconnecting the antenna from the on-card electronics.

The switching mechanism may advantageously take the form of normally spaced-apart electrical contacts positioned adjacent to one another within the card but held in a non-contacting relationship by a resilient material. When the cardholder presses on the surface of the card in a predetermined location, the outer surface of the card deflects, moving one of the two contacts into engagement with the other while deforming the resilient material. When the applied pressure is removed, the resilient material moves the contacts apart again, breaking the electrical connection, and disabling the card's ability to receive and transmit information via antenna. The electrical contacts may be positioned for sliding engagement with one another to provide a self-wiping action to ensure a good electrical connection.

The outer surface of the card adjacent to the switch contacts may be advantageously molded to form a resilient, a dome-shaped dimple that acts as a Belleville spring. The cardholder can feel the presence of the dimple on the card, providing a tactile indication to the cardholder of the place on the card which should be pressed to activate the card. In addition, when the dome-shaped dimple is depressed, it deforms to allow the cardholder to feel proprioceptive feedback as the switch closes. The chamber which enclosed by the dimple may be sealed except for one or more bleed apertures which permit a measured flow of air or fluid into and out of the chamber. When the dimple is depressed, the air is expelled through the bleed aperture. Then, when the cardholder releases the dimple, the air or fluid is returned into the chamber at a timed rate, creating a time delay before the switch contacts again open as the dimple returns to its normal shape. This same principle of an aperture can allow fluid to creep from one internal bladder to another in the card to allow the button to move and to be used as a timer as well.

DETAILED DESCRIPTION OF THE INVENTION

RF-enabled cards, identification tags, and the like (referred to as "cards" or "data cards") carry data which typically identifies and relates to a specific person, a particular account, an individual vehicle, or an item, and further contains additional data supporting applications through item specific information or instructions immediately available on reading the card.

A RFID system requires, in addition to the data cards, a means of reading or interrogating the data cards and communicating the data between the card and a host computer or information management system (hereinafter referred to as a "reader"). Communication of data between the cards and a reader is achieved by wireless communication, either based upon close proximity electromagnetic or inductive coupling, or based upon propagating electromagnetic waves. Coupling is achieved using antenna structures forming an integral feature in both data cards and readers. As used here, the term "antenna" refers to both propagating systems as well as inductive systems.

Data storage and processing as well as RF communications functions are typically performed on the data card by one or more integrated circuit chips. For example, the SRIX4K Smartcard Chip available from STMicroelectronics is a integrates a power reception system which uses the received RF signal as a power source, an emitter/receiver module compatible with the ISO 14443 standard, together with an asynchronous 8-bit micro-controller. The chip contains a 4096-bit user EEPROM fabricated with CMOS technology and stores data in 128 blocks of 32 bits each. The SRIX4K is accessed via the 13.56 MHz carrier. Incoming data are demodulated and decoded from the received amplitude shift keying (ASK) modulation signal and outgoing data are generated by load variation using bit phase shift keying (BPSK) coding of a 847 kHz sub-carrier. The SRIX4K chip is further described in the paper "A New Contactless Smartcard IC using an On-Chip Antenna and an Asynchronous Micro-controller" by Abrial A., at al., 26th European Solid-State Circuits Conference, Stockholm, Sep. 19, 20, 2000.

Using the STMicroelectronics single chip coupler, CRX14, design a reader may be readily designed to create a complete a RFID system. Although these and other such systems include electronic authentication mechanisms for enhanced security, it is nonetheless desirable to enhance the security of the information on the data card by affirmatively disabling the data card except when the holder intends to use it.

Figure 1:
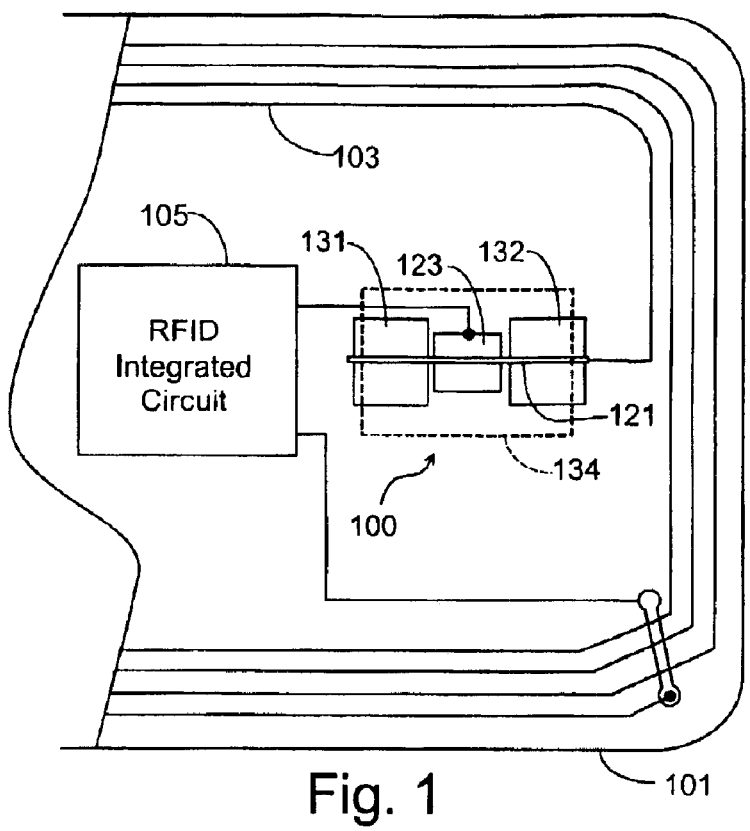
FIG. 1 is a top plan view of an RF-enabled payment card which employing a pressure-actuated manual switch for protecting the card against unauthorized use.
Figure 2:
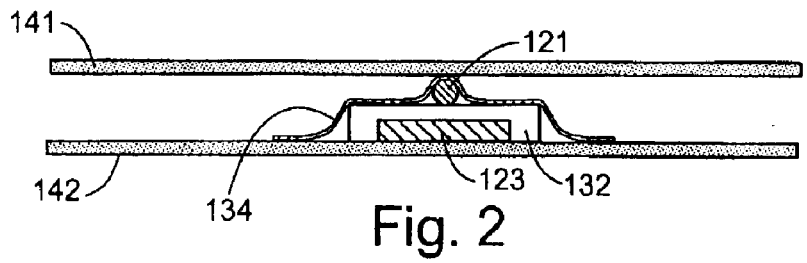
FIGS. 2 and 3 are cross-sectional views of the switch mechanism used in the payment card of card of FIG. 1 shown in its normal and actuated states, respectively.
Figure 3:
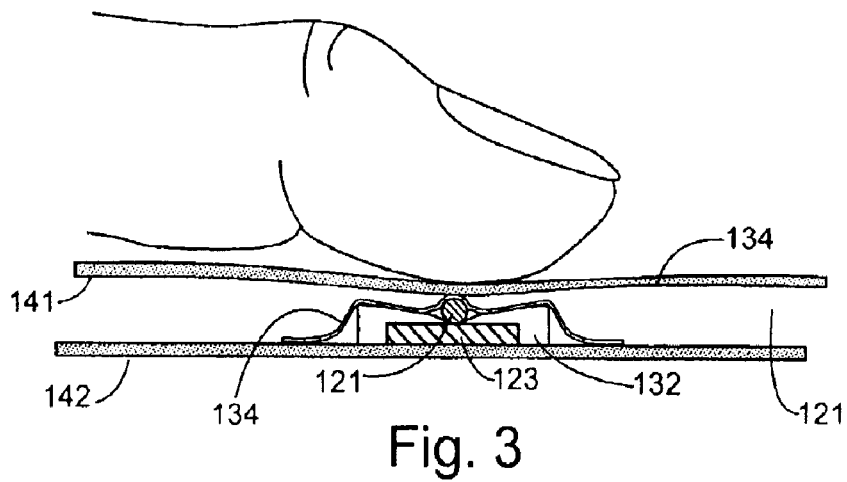

FIG. 1 illustrates a low-cost, user-operated, pressure responsive switch mechanism 100 on an RFID payment card 101 which disconnects the antenna 103 from the on-card integrated circuit 105 when the card is not in use. The switch mechanism 100, seen in cross-section in FIGS. 2 and 3, is formed by a wire 121 connected to one end of the antenna 103 and held in a normally spaced-apart relationship from an electrical contact pad 123 by a two support cushions 131 and 132. The cushions 131 and 132 are formed of a resilient material and are positioned on each side of the contact pad 123. The wire 121 is secured by a thin adhesive strip 134 indicated by the dotted rectangle in FIG. 1.

The switch assembly 100 is sandwiched between two planar panels 141 and 142 which form the outer surfaces of the card 101 and which also house the integrated circuit 105 and the antenna 103. The panels 141 and 142 are attached at their periphery to form a sealed housing for the on-card electronics, switching mechanisms and antenna, and may be formed using any suitable non conducting material. The antenna 103 is formed with a helical conductive trace which follows the outer periphery of the card 101 and is available from RCD Technology Corporation, Bethlehem, Pa. The antenna could be made from any suitable conducting antenna design.

The switch assembly 100 is actuated to complete a circuit between the antenna 103 and the chip 105 when the user pressed inwardly on the flexible outer surface of the card as illustrated in FIG. 3. The resilient cushions 131 and 132 deform, allowing the wire 121 to move into engagement with the contact pad 123 to establish and electrical connection. Note that, as shown in FIG. 3, the wire 121 is relatively rigid and moves downwardly in cantilever fashion with the resiliency being supplied primarily by the supporting cushions. Alternatively, the wire may be flexible and resilient and be supported at one or both ends. In this case, the wire acts as a spring, its resiliency preventing it from making contact until the surface of the data card is pressed, and when pressure is released, the wire pops back up, breaking the contact and terminating the electrical connection between the chip 103 and the antenna 105.

Figure 4:
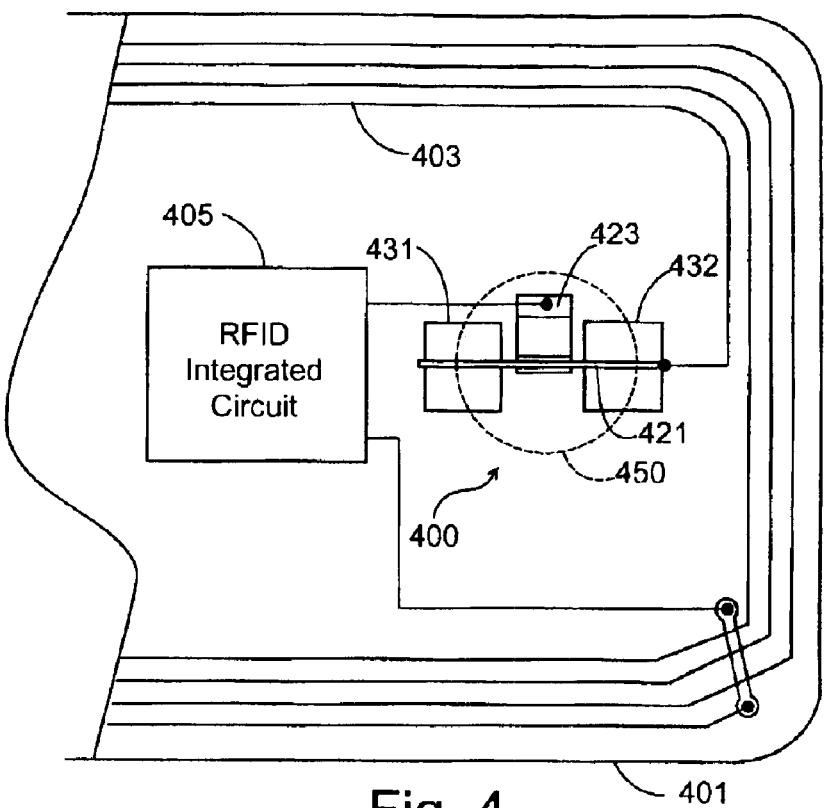
FIG. 4 is a top plan view of an RF-enabled payment card which employs a pressure-operated manual switch using a dome-shaped dimple on the card's surface to facilitate actuation of the switch.

FIG. 4 illustrates a second pressure responsive switch mechanism 400 on an RFID payment card 401 which disconnects the antenna 403 from the on-card integrated circuit 405 when the card is not in use. The switch mechanism 400, seen in cross-section in FIGS. 5 and 6, includes a wire 421 connected to one end of the antenna 403 and held in a normally spaced-apart relationship from an electrical contact pad 423 by a two support cushions 431 and 432. The cushions 431 and 432 are formed of a resilient material and are positioned on each side of the spring clip contact 123. The wire 421 may be secured by a thin adhesive strip (not shown in FIGS. 4–6) as shown at 134 in FIGS. 1–3.

Figure 6:
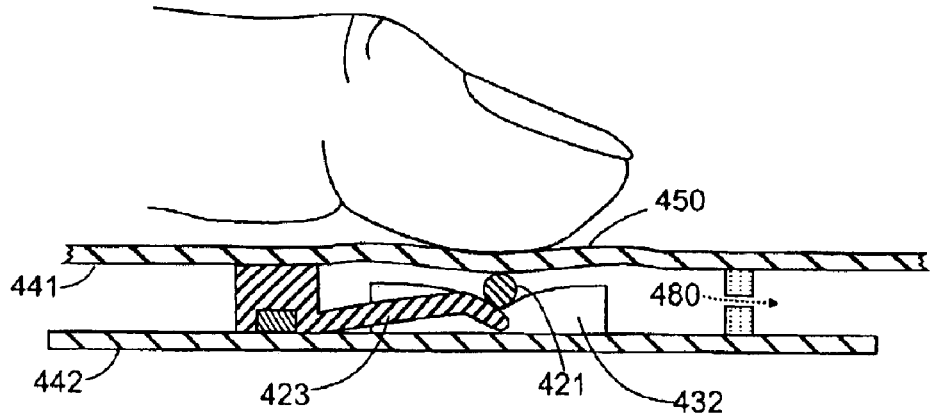

The switch assembly 400 is sandwiched between two planar panels 441 and 442 which form the outer surfaces of the data card 401 and which also house the integrated circuit 405 and the antenna 403. The panel 441 is molded to form a dome shaped dimple seen at 450 which is positioned over the switch assembly 400 and acts as a Belleville spring. When the user presses on the dimple 450 as shown in FIG. 6, the resilient dimple deflects inwardly, urging the wire 421 into engagement with the distal end 452 of the cantilevered arm of the spring clip 423. The upper surface of the clip end 452 is oriented at an angle to the direction of motion of the wire 421, creating a wiping action as the wire and clip engage, and providing self-cleaning of the metallic contacts to ensure a good electrical connection during the life of the card.

The cardholder can feel the presence of the dimple on the card, providing a tactile indication to the cardholder of the place on the card which should be pressed to activate the card. In addition, when the dome-shaped dimple is depressed, it deforms to allow the cardholder to feel a significant movement as the switch closes. The noticeable movement provides tactile feedback to the cardholder to confirm that the switch has been properly activated.

Figure 5:
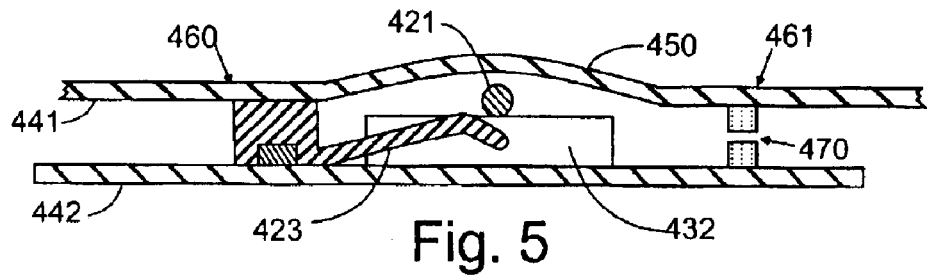
FIGS. 5 and 6 are cross-sectional views of the switch mechanism used in the payment card of FIG. 4 shown in its normal and actuated states, respectively.

The chamber which enclosed by the dimple may be sealed as shown in FIG. 5 at 460 and 461, except for one or more bleed apertures as seen at 470 which permit a measured flow of air or fluid into and out of the chamber. When the dimple 450 is depressed, the air or fluid is expelled through the bleed aperture as shown at 480 in FIG. 6. Then, when the cardholder releases the dimple 450, the air or fluid is returned into the chamber through the aperture 470 at a timed rate, creating a time delay before the switch contacts again open as the resilient dimple returns to its normal shape. The time delay provides a prolonged time interval during which the card is enabled to permit the chip to be powered up and communicate with the remote reader. Note also that, by filling the chamber with a fluid, the switch contacts may be protected against corrosion.

Figure 7:
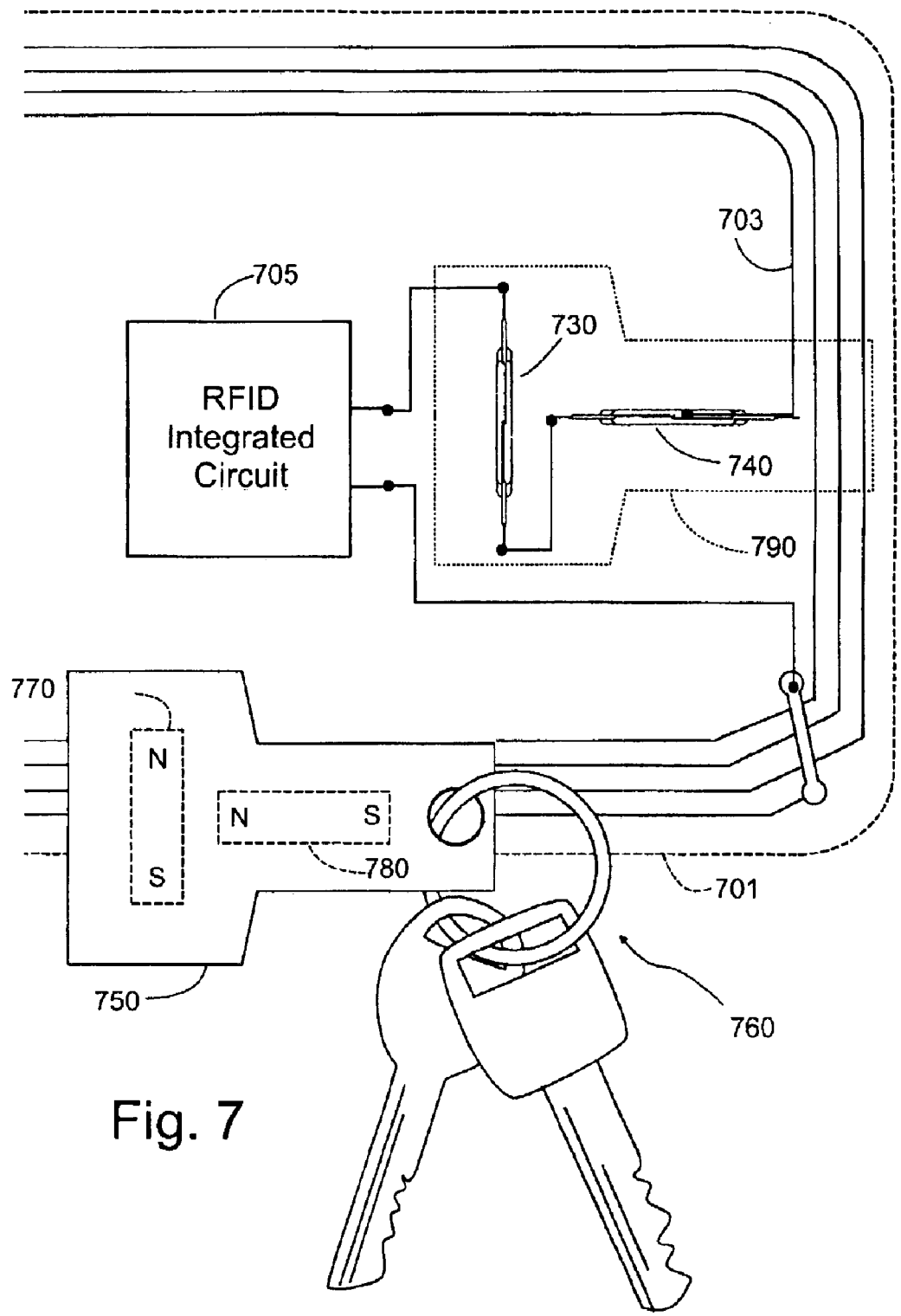
FIG. 7 is a plan view of an RF-enabled payment card using magnetically actuated switch contacts and a key device for enabling the card.

FIG. 7 shows a further embodiment of the invention in which the chip 705 is connected to the antenna 703 through the series combination of two normally open, magnetically-operated reed switches 730 and 740 which are oriented perpendicular to one another. The card is activated by key 750 formed off non-permeable material which contains a pair of perpendicularly oriented permanent magnets 770 and 780. The magnets 770 and 780 are also oriented perpendicular to one another and are spaced such that, when the key 750 (shown attached to a key ring 760) is placed in the proper position adjacent to the surface of the card 701, the magnets close both reed switches to connect the chip and antenna. The cardholder may position the key 750 on the card in alignment with the guidelines graphically printed on the card surface as illustrated at 790.

Each of the reed switches 730 and 740 consists of a pair of flexible reeds made of a magnetic material and sealed in a glass tube filled with inert gas. The reeds are overlapped but separated by a small gap. The contact area of each reed is plated with a noble metal, such as Rhodium or Ruthenium, to provide the switch with stable characteristics and long life. Application of a magnetic field, generated by the permanent magnets 770 and 780, to the switches causes the reeds to be magnetized. Only a magnetic field strong enough to overcome the resistive force caused by elasticity of the reed will close the circuit, and once the magnetic field is removed, the reeds are separated again by the effect of elasticity of the reeds. By orienting the reed switches perpendicular to one another, they are less likely to be simultaneously closed by any magnetic field from a more distant source. Suitable ultra-miniature reed switches having an outside diameter of 0.075 inches are available from Aleph International, San Fernando, Calif. 91340. It should be noted that magnetically operated switches may be formed from components which are an integral part of the mechanical and electrical structures of the card, thereby reducing cost by eliminating the need to procure and assemble individual switching components, such as reed switches.

Figure 8:
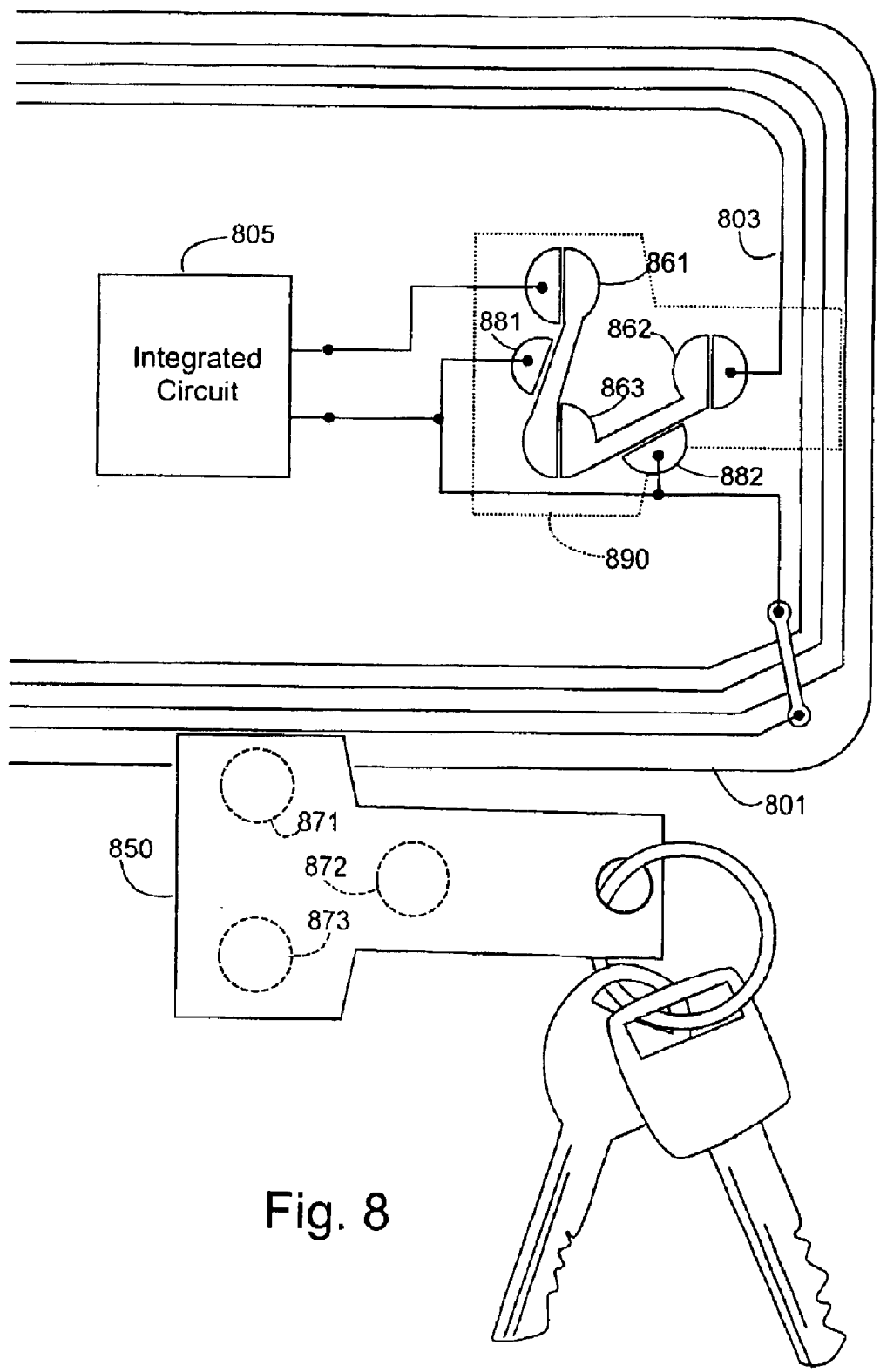
FIG. 8 is a plan view of an RF-enabled payment card which employs capacitive coupling by a matching key device for enabling the card.

A still further embodiment of the invention shown in FIG. 8 of the drawings employs capacitive coupling between a pattern of thin film conductors on the card 801 and a corresponding pattern of conductors on a key 850. The pattern on the card includes three pairs of adjacent semicircles seen at 861, 862 and 863. The key 850 is formed on non-conducting material and carries three conductive disks 871, 872 and 873. When the key 850 is properly positioned flush against the surface of the card 801, with the disks 871, 872 and 873 aligned with the patterns 861, 862 and 863 respectively, each disk on the key capacitively couples each pair of semicircular patterns on card, forming a pathway on the card for the radio frequency signal induced on the antenna 803. Because of the high frequency of the signal (e.g. a 13.56 MHz carrier), the capacitive coupling added by the proximity of the matching key disks provides a low impedance path to complete the circuit.

To prevent the card from being activated when placed near other electrically conductive items, an additional pair of semicircular patterns seen at 881 and 882 are placed between the semicircular patterns 861, 862 and 863. When conductive material is in the vicinity of either the semicircular pattern 881 or 882, the resultant capacitive coupling produces a low impedance path across the antenna terminals, effectively "short circuiting" the antenna and disabling the connection. In this way, to enable the card, the cardholder may position the key 850 on the card in alignment with the guidelines graphically printed on the card surface as illustrated at 890. If a matching key is not properly placed relative to the card, the card will not be enabled and cannot be surreptitiously read.

The switching mechanisms described above may be used to selectively connect the chip electronics to different portions of the on-card antenna, allowing the card to be selectively tuned to different resonant frequencies. The card may be pressed in different positions to activate different switching elements, and different keys, or different placements of a single key, may be used to selectively close only certain on-card switches to provide the needed connections.

It is to be understood that the methods and apparatus which have been described are merely illustrative applications of the principles of the invention. Numerous modifications may be made to the arrangements described without departing from the true spirit and scope of the invention.

What is claimed is:

1. A radio operated data card comprising, in combination,
   an on-card antenna,
   on-card electronic circuitry including a data memory and a transceiver for transferring data between said memory and a remote host system via said antenna,
   a user-activated, normally open electrical switching circuit connected between the on-card electronic circuitry and said on-card antenna, said normally open switching circuit disabling the transfer of information via said antenna until said switching circuit is intentionally closed by a cardholder to enable such transfer, said switching circuit automatically reopening after being intentionally closed by the cardholder to again disable such transfer,
   said antenna, said on-card electronic circuitry and said electrical switching circuit being sandwiched between first and second planar panels which form outer surfaces of said data card,
   said switching circuit comprising, in combination,
   first and second normally spaced-apart conductive electrical contacts, said first contact being located adjacent to said first planar panel and being moved into contact with said second contact to close said switching circuit when the cardholder applies pressure to said first panel, and
   a deformable support cushion positioned to intercept said first contact as it moves into contact with said second contact, said deformable cushion urging said first contact away from said second contact to reopen said switching circuit when said pressure is no longer applied to said first panel.

2. A radio operated data card as set forth in claim 1 wherein said on-card electrical circuitry receives electrical energy from said remote host system when said switching circuit is intentionally closed by said cardholder but receives no power via said antenna when said switching circuit is open.

3. A radio operated data card as set forth in claim 1 wherein at least one of said electrical contacts is formed from a resilient material that deforms as said electrical contacts are moved into electrical contact with one another.

4. A radio operated data card as set forth in claim 1 wherein said first panel defines an external surface which deforms when external pressure is applied by the cardholder, the deformation of said external surface causing said switch contacts to be moved into electrical contact with one another.

5. A radio operated data card as set forth in claim 4 wherein said external pressure must be applied at a predetermined location on said external surface to cause said switch contacts to move.

6. A radio operated data card as set forth in claim 5 wherein said external surface defines at least one tactile feature whose position is discernable by touch to said cardholder to indicate the position of said predetermined location.

7. A radio operated data card as set forth in claim 4 wherein said external surface is formed into a dome-shaped dimple at a predetermined location, said dimple acting as a resilient Belleville spring that deforms when pressed by the cardholder to close said switching circuit but which resumes its dome shape when pressure is released.

8. A radio operated data card as set forth in claim 1 wherein said automatically reopening after said switching circuit is intentionally closed by said cardholder is delayed to maintain said switching circuit in closed condition for at least a predetermined minimum time.

9. A radio operated data card comprising, in combination,
an on-card antenna,
on-card electronic circuitry including a data memory and a transceiver for transferring data between said memory and a remote host system via said antenna, and
a user-activated, normally open electrical switching circuit connected between the on-card electronic circuitry and said on-card antenna, said normally open switching circuit disabling the transfer of information via said antenna until said switching circuit is intentionally closed by A cardholder to enable such transfer, said switching circuit automatically reopening after being intentionally closed by the cardholder to again disable such transfer, and
a mating external key device in the possession of the cardholder for closing said switching circuit when said key device is brought into proximity to said switching circuit.

10. A radio operated data card as set forth in claim 9, wherein said electrical switching circuit is closed by the application of a magnetic field produced by said external key device.

11. A radio operated data cArd as set forth in 9 wherein at least one of said electrical contacts comprises a ferromagnetic material that is moved by the application of an external magnetic field.

12. A radio operated data card as set forth in claim 11 wherein said external magnetic field is applied by said mating external key in the possession of the cardholder which is brought into proximity to said card.

13. A radio operated data card as set forth in claim 9 wherein said electrical circuit includes at least two spaced apart internal conductive members and wherein said external key device includes a further conductive member which capacitively couples said internal conductive members when said key is brought into proximity to said switching circuit.

14. A radio operated data card comprising an outer jacket defining a sealed protected housing for internal electrical components, said components comprising:
on-card electronic circuitry including a data memory,
an on-card antenna,
a transceiver for transferring data between said memory and a remote host system via said antenna, and
normally open electrical switch contacts connected between the on-card electronic circuitry and said on-card antenna, said normally open switching circuit disabling the transfer of information via said antenna until said switch contacts are intentionally closed by a cardholder to enable such transfer, said switching circuit automatically reopening after being intentionally closed by the cardholder to again disable such transfer,
wherein an external surface of said jacket defines at least one tactile feature whose position is discernable by touch to the cardholder and wherein said jacket deforms when the cardholder applies an external force at said position, the deformation of said jacket closing said switch contacts.

15. A radio operated data card as set forth in claim 14 wherein said tactile feature is formed by a dome-shaped dimple on said external surface, said dimple acting as a resilient Belleville spring that deforms when pressed by the cardholder to close said switching circuit but which resumes its dome shape when pressure is released.

* * * * *